United States Patent Office 3,277,070
Patented Oct. 4, 1966

3,277,070
PROCESS AND CATALYST FOR POLYM-
ERIZATION OF OLEFINS
Robert Van Weynbergh, Forest, Brussels, and Jacques
Stevens, Braine-l'Alleud, Belgium, assignors to Solvay
& Cie, Societe en Commandite, a simple of the Kingdom
of Belgium
No Drawing. Filed Mar. 14, 1963, Ser. No. 265,056
Claims priority, application Belgium, Apr. 16, 1962,
616,490
18 Claims. (Cl. 260—94.9)

The present invention concerns a process for the polymerization of olefins in the presence of a catalyst comprising a supported oxygenated compound of chromium and one or more organometallic compounds. In another aspect, it relates to an improved catalyst.

It is known to carry out the polymerization of aliphatic 1-olefins by contacting them with a catalyst comprising an oxygenated compound of chromium and at least one oxide acting as a support, chosen from among silica, alumina, zirconia, and thoria. In such a catalyst, part at least of the chromium is found in the hexavalent state at the beginning of the reaction. As oxygenated compound of chromium it has been proposed to use chromium oxide or a compound capable of decomposing into chromium oxide by calcination (Belgian Patent 530,617). With the object of increasing their productivity, these catalysts are activated by heating in dry atmosphere at a temperature which can vary from 32 to 816° C. when a porous material (Belgian Patent 562,448) is used as support, and which can reach temperatures close to 1200° C. when nonporous supports (Belgian Patent 594,956) are used. According to that process, polyolefins of very high molecular weight, that is, with low melt index, can be obtained by lowering the polymerization temperature. This involves the serious disadvantage of decreasing the polymerization rate and the capacity of the reactors.

The utilization of different organometallic cocatalysts in combination with chromium oxide catalysts for the polymerization of olefins has already been described. Thus a catalyst made by depositing $CrO_3$ on a silica-alumina support, activated at high temperature and then treated with a trialkylaluminum has been used for the manufacture of polyethylene of medium density (French Patent 1,242,530). This polyethylene, of relatively high melt index, generally higher than 1, is especially suitable for injection molding.

The polymerization of propylene and of 1-butene to solid polymers, containing a crystalline fraction by using, as catalyst, chromium oxide deposited on a silica-alumina support and, as cocatalyst, $Al(C_2H_5)_3$ has also been described. [La Chimica e l'Industria (Milan) 38, 124 (1956).]

The present invention has for an object an improved process which permits polyolefins of high density, high molecular weight, that is, low melt index, to be obtained. Another object is to enable such polymerization to be carried out at relatively high temperatures and with very high reaction rates. Another object is to provide an improved catalyst system. As another object, the invention also permits the production capacity of the polymerization reactors to be increased by elevation of the polymerization temperature. Other objects and advantages will become apparent to those skilled in the art on inspection of this disclosure.

The present invention concerns the polymerization (including copolymerization) of olefins in the presence of a catalyst comprising an oxygenated compound of chromium, at least partially in the hexavalent state, and of a cocatalyst consisting of one or more complex organometallic compounds of the general formula $$M(M'R_{4-x}X_x)_y$$

in which M is a metal of Groups Ia or IIa of the Periodic Classification of Elements, M' is a metal of Group IIIb, R is an organic radical, X is a hydrogen or halogen atom, y is a number equal to the valence of the metal M, and x is a whole number selected from 0, 1, 2 and 3.

The Periodic Classification of Elements referred to herein is shown on the H. D. Hubbard "Periodic Chart of the Atoms," 1956 edition, W. M. Welch Manufacturing Company, Chicago, Illinois.

Examples of organic R groups which satisfy the general formula above are: alkyl, aryl, cycloalkyl, alkylaryl and arylakyl hydrocarbon radicals, e.g. those containing from 1 to 10 carbon atoms.

Among the complex organometallic compounds which correspond to the general formula can be cited particularly: $NaAl(i.C_4H_9)_4$, $LiAl(C_2H_5)_4$, $KAl(CH_3)_4$, $$Mg[Al(C_2H_5)_4]_2, KB(C_6H_5)_4, Mg[B(C_2H_5)_4]_2$$
$$Ba[B(C_2H_5)_4]_2, NaAl(i.C_4H_9)_3F, CsAl(C_2H_5)_3Cl$$
$$NaAl(C_2H_5)_2F_2, NaAl(i.C_4H_9)_3, LiAl(i.C_4H_9)_2H_2$$
$$NaB(C_6H_5)_3H$$

Such complex organometallic compounds are well known and have been described in the literature. For example, the physical properties of the complexes $$NaAl(C_2H_5)_4$$

and $LiAl(C_2H_5)_4$ and their synthesis from triethylaluminum and, respectively, ethylsodium and ethyllithium (J. Am. Chem. Soc. 75, 5193 (1953)), have been described. These syntheses are readily conducted in the laboratory.

The utilization of cocatalysts according to the invention permits the manufacture of polymers of very high molecular weight, characterized by a very low melt index, and this, while retaining very high polymerization rates and while working at relative high temperatures. The maintenance of a high temperature in the polymerization reactor facilitates removal of the heat released during the polymerization and an increase in the production capacity of the reactors.

Thus, by applying the process according to the invention to the polymerization of ethylene, in solution in cyclohexane, polyethylene of an average molecular weight, measured according to the method of Dienes and Klemm (J. Appl. Phys., 17, 458, June 1946), higher than 50,000, corresponding to a viscosity index lower than 0.3 (measured according to the ASTM Standard D1238–57T) has been prepared by carrying out the reaction at a temperature between 140° and 150° C. Such high temperatures correspond to large production capacities of the reactors and furthermore allow the risks of precipitation of the polymer on the cold walls of the reactor to be reduced considerably.

It has also been observed that the molecular weight of the polymer can be varied by varying the amount of cocatalyst used. The process according to the invention thus permits a whole range of polyolefins of various physical and mechanical properties to be manufactured in a single polymerization installation. Usually the molar ratio of organometal compound to chromium ranges from 0.5:1 to 10:1, from 1.5:1 to 3:1 being most frequently used. Ratios higher than 10:1 can be used.

In the process according to the present invention, the complex organometallic compound playing the role of cocatalyst preferably is added to the catalyst in the form of a solution in a hydrocarbon. A hydrocarbon which serves as solvent medium for the polymerization, such as cyclohexane or n-hexane, can be used, for example.

The mixing of the catalyst and the cocatalyst can be carried out very simply by contacting, in an inert atmosphere and in an inert solvent, a suspension of supported and activated chromium oxide with the solution of complex organometallic cocatalyst. The reaction is produced immedately at room temperature (15°–30° C.) and the product thus obtained can serve, without other treatment, for the polymerization of the olefins. To obtain the best activity it is advisable to use the catalytic composition immediately after its preparation.

The amount of cocatalyst added varies according to the nature of the metals M and M′ which constitute the complex organometallic compound, acording to the conditions of polymerization and according to the properties which it is desired to confer on the polymer.

The polymerization can be carried out in an inert solvent at a relatively high temperature, between 120° and 200° C. and perferably between 135° and 170° C., under a pressure of about 10 to 40 kgr./cm².

The polymerization process according to the invention is applied to all the olefins and particularly to ethylene, as well as to the olefins containing 3 to 6 carbon atoms. The process also permits the manufacture of copolymers of conjugated olefins and diolefins, for example ethylene-propylene, ethylene-1-butene and ethylene-1-butene-butadiene copolymers.

The following examples are inteded to make the spirit and the object of the invention better understood, without having any limiting character.

*Example I*

By way of comparison with the process according to this invention, and to demonstrate better the advanages, a polymerization test was carried out in the presence of a catalyst of the prior art, used alone.

The catalyst is prepared by impregnating, a silica-alumina support containing, per kg., 870 gm. of silica and 130 gm. of alumina with an aqueous solution of chromic anhydride. The catalyst obtained contains 25 gm. of chromium per kg. in the dry state. It is activated by heating in a dry air current for about 15 hours at 560° C.

0.250 gm. of catalyst and 450 gm. of cyclohexane are introduced into a perfectly clean and dry stainless steel autoclave of 1.5 L, carefully purged with nitrogen. The catalyst is kept in suspension in the cyclohexane by energetic agitation. The temperature of the reactor is brought to about 140° C. Very pure ethylene is introduced up to a pressure in the autoclave of 31.5 kg./cm.². Then ethylene is allowed to polymerize under this pressure, kept constant by the continuous introduction of the monomer and, by keeping the temperature at 136° C.

After half an hour, the polymerization is stopped by allowing the ehtylene to escape. The polymer is dried under vacuum, weighed and examined. Under the conditions of the run, 146 gm. of polymer whose melt index, measured according to the ASTM Standard D1238–57T, is 1.0 is obtained.

A run is conducted exactly as in the control run just described but, to the catalyst in the autoclave, 16 cc. of a 1.32 weight percent solution of LiAl($C_2H_5$)$_4$ in dry toluene is added. Thus a catalytic composition is obtained in which the Al/Cr mol ratio is 2.

The polymerization of ethylene is then carried out under the same conditions as those described in the control run. Thus 47 gm. of polymer whose melt index is 0.3 is obtained.

*Example II*

The polymerization of ethylene is carried out under conditions identical to those described in Example I, in the presence of a catalyst prepared by adding in the autoclave, to 0.25 gm. of supported chromium oxide, 11 cc. of an 0.76 weight percent solution of NaAl(i-$C_4H_9$)$_4$ in dry cyclohexane. The Al/Cr mol ratio of the catalytic composition is 1.95.

After half an hour of polymerization 99 grams of high molecular weight polyethylene whose melt index is 0.06 is obtained.

*Example III*

The polymerization of ethylene is carried out as in Example I, but to the catalyst in the auoclave, 16.3 cc. of an 0.45 weight percent solution of NaAl(i.$C_4H_9$)$_3$F in dry cyclohexane is added. Thus a catalytic composition in which the Al/Cr mol ratio is 2 is obtained.

The polymerization is then carried out under the same conditions as those described in Example I.

Thus 66.2 gm. of polymer whose melt index is 0.13 is obtained.

*Example IV*

The polymerization of ethylene is carried out under conditions identical to those described in Example I, in the presence of a catalyst prepared by adding in the autoclave, to 0.25 gm. of chromium oxide catalyst, an amount of a solution of NaB($C_2H_5$)$_4$ in dry toluene, such that the mol ratio B/Cr is equal to 2.

At the end of half an hour of polymerization 32 gm. of purified and dried polymer whose melt index is 0.26 is obtained.

We claim:

1. A process which comprises polymerizing at least one 1-olefin to solid polymer in the presence of a catalyst which forms on mixing a supported oxygenated compound of chromium, at least part of the chromium being hexavalent, with at least one complex organometal compound of the general formula

$$M(M'R_{4-x}X_x)_y$$

in which M is a metal of Groups Ia or IIa of the Periodic Classification of Elements, M′ is a metal of Group IIIb, R is a hydrocarbon radical, X is selected from the group consisting of halogen and hydrogen, y is a number equal to the valence of the metal M and x is a whole number chosen from among 0, 1, 2 and 3.

2. Process according to claim 1, wherein the organometal compound is selected from the group consisting of LiAlR$_4$, NaAlR$_4$, KAlR$_4$, Mg[Al(R)$_4$]$_2$ and NaBR$_4$, in which R is an alkyl, cycloalkyl, aryl, aralkyl or alkaryl radical containing from 1 to 10 carbon atoms, the polymerization is effected at a temperature in the range 120° to 200° C., and the olefin contains from 2 to 6 carbon atoms per molecule.

3. A process according to claim 1, wherein the organometal compound is NaAl(i.$C_4H_9$)$_4$, the olefin is ethylene, and the polymerization temperature is in the range 135° to 170° C.

4. A process according to claim 1, wherein the organometal compound is NaAl(i-$C_4H_9$)$_3$F, the olefin is ethylene, and the polymerization temperature is in the range 135° to 170° C.

5. A process according to claim 1, wherein the organometal compound is NaAl(i.$C_4H_9$)$_3$F, the olefin is ethylene, and the polymerization temperature is in the range 135° to 170° C.

6. A process according to claim 1 wherein the organometal compound is LiAl($C_2H_5$)$_4$, the olefin is ethylene, and the polymerization temperature is in the range 135° to 170° C.

7. A process according to claim 1 wherein the organometal compound is NaAl(i-$C_4H_9$)$_3$H.

8. In a process for the production of solid polymer by polymerizing ethylene in the presence of a catalyst comprising chromium oxide supported on a material selected from the group consisting of silica, alumina, zirconia, and thoria in the presence of a liquid hydrocarbon diluent at a temperature in the range 120 to 200° C., the improvement which comprises contacting said catalyst, prior to said polymerization, with an organometal compound having the formula $$M(M'R_{4-x}X_x)_y$$

in which M is a metal of Groups Ia or IIa of the Periodic Classification of Elements, M' is a metal of Group IIIb, R is a hydrocarbon radical selected from the group alkyl, aryl, cycloalkyl, alkaryl, and aralkyl, X is selected from the group consisting of halogen and hydrogen, $y$ is a number equal to the valence of the metal M and $x$ is a whole number chosen from among 0, 1, 2 and 3, said contacting being effected with said catalyst in suspension and said organometal compound in solution in a liquid hydrocarbon diluent, at least part of the chromium in said catalyst being hexavalent at the initial contacting with said organometal compound, and supplying a resulting catalyst mixture to the polymerization zone.

9. A process for modifying a catalyst comprising chromium oxide supported on an oxide selected from the group consisting of silica, alumina, zirconia, and thoria, which comprises contacting said catalyst with an organometal compound represented by the formula $$M(M'R_{4-x}X_x)_y$$

in which M is a metal of Groups Ia or IIa of the Periodic Classification of Elements, M' is a metal of Group IIIb, R is a hydrocarbon radical selected from the group alkyl, aryl, cycloalkyl, alkaryl, and aralkyl, X is selected from the group consisting of halogen and hydrogen, $y$ is a number equal to the valence of the metal M and $x$ is a whole number chosen from among 0, 1, 2, and 3, at least part of the chromium in said catalyst being hexavalent at the initial contacting with said organometal compound.

10. A process according to claim 9 wherein the chromium oxide is supported upon silica-alumina, said contacting occurs at room temperature in a liquid hydrocarbon medium, and said organometal compound is lithium aluminum tetraethyl.

11. The process according to claim 9 wherein said chromium oxide is supported upon silica-alumina, said contacting is effected at room temperature in a liquid hydrocarbon medium, and said organometal compound is sodium aluminum tetraisobutyl.

12. A process according to claim 9 wherein the chromium oxide is supported on silica-alumina, the contacting is effected at room temperature in a liquid hydrocarbon medium, and said organometal compound is sodium aluminum triisobutylmonofluoride.

13. A process according to claim 9 wherein said chromium oxide is supported on silica-alumina, said contacting is effected at room temperature in liquid hydrocarbon medium, and said organometal compound is sodium boron tetraethyl.

14. A modified catalyst which forms on contacting chromium oxide supported on an oxide selected from the group consisting of silica, alumina, zirconia and thoria with an organometal compound having the formula $$M(M'R_{4-x}X_x)_y$$

in which M is a metal of Groups Ia or IIa of the Periodic Classification of Elements, M' is a metal of Group IIIb, R is a hydrocarbon radical selected from the group alkyl, aryl, cycloalkyl, aralkyl, and alkaryl, X is selected from the group consisting of halogen and hydrogen, $y$ is a number equal to the valence of the metal M and $x$ is a whole number chosen from among 0, 1, 2, and 3, at least part of the chromium in said catalyst being hexavalent at the initial contacting.

15. A modified catalyst in accordance with claim 14 wherein the chromium oxide is supported on silica-alumina, said organometal compound is lithium aluminum tetraethyl and the mol ratio of said organometal compound to chromium in said catalyst is approximately 2:1.

16. A catalyst according to claim 14 wherein the chromium oxide is supported on silica-alumina, said organometal compound is sodium aluminum tetraisobutyl, and the mol ratio of said organometal compound to chromium in said catalyst is approximately 2:1.

17. A catalyst according to claim 14 wherein said chromium oxide is supported on silica-alumina, said organometal compound is sodium aluminum triisobutyl monofluoride, and the mol ratio of said organometal compound to chromium in said catalyst is aproximately 2:1.

18. A catalyst according to claim 14 wherein said chromium oxide is supported on silica-alumina, said organometal compound is sodium boron tetraethyl, and the molar ratio of said organometal compound to chromium in said catalyst is approximately 2:1.

References Cited by the Examiner

UNITED STATES PATENTS 2,824,089  2/1958  Peters et al. _____ 260—94.9
3,105,066  9/1963  MacKenzie _____ 260—94.9

JOSEPH L. SCHOFER, *Primary Examiner.*

F. L. DENSON, *Assistant Examiner.*